US012767256B2

(12) United States Patent
Jeong et al.

(10) Patent No.: US 12,767,256 B2
(45) Date of Patent: Oct. 20, 2026

(54) PANEL ASSEMBLE APPARATUS

(71) Applicants: HYUNDAI MOTOR COMPANY, Seoul (KR); KIA CORPORATION, Seoul (KR)

(72) Inventors: Yongchul Jeong, Hwaseong-si (KR); Minje Oh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/941,694

(22) Filed: Nov. 8, 2024

(65) Prior Publication Data

US 2025/0187686 A1 Jun. 12, 2025

(30) Foreign Application Priority Data

Dec. 8, 2023 (KR) ........................ 10-2023-0177521

(51) Int. Cl.
*B62D 65/06* (2006.01)
*B62D 65/02* (2006.01)

(52) U.S. Cl.
CPC ........... *B62D 65/06* (2013.01); *B62D 65/026* (2013.01)

(58) Field of Classification Search
CPC .............................. B62D 65/06; B62D 65/026
See application file for complete search history.

(56) References Cited

U.S. PATENT DOCUMENTS

2021/0178447 A1* 6/2021 Takatsu ................ B21D 43/003

* cited by examiner

*Primary Examiner* — Nirvana Deonauth
(74) *Attorney, Agent, or Firm* — Lempia Summerfield Katz LLC

(57) ABSTRACT

A panel assemble apparatus includes: a marriage jig frame, a plurality of alignment units installed in the marriage jig frame to align a main panel part to a predetermined position on the marriage jig frame, and a plurality of external force application units installed on the marriage jig frame to induce elastic deformation in the main panel part and form a marriage path along which a correlation panel part to be assembled with the main panel part can move.

6 Claims, 17 Drawing Sheets

PANEL ASSEMBLE APPARATUS

CROSS-REFERENCE TO RELATED APPLICATION

This application claims priority to and the benefit of Korean Patent Application No. 10-2023-0177521 filed in the Korean Intellectual Property Office on Dec. 8, 2023, the entire contents of which are incorporated herein by reference.

BACKGROUND

(a) Field

The present disclosure relates to a panel assemble apparatus. More particularly, the present disclosure relates to a panel assemble apparatus applied to a marriage process of panel components.

(b) Description of the Related Art

Typically, various moving parts, such as door, hood, and tail gate panel parts, are assembled on the vehicle body. Among these panel parts, hoods have recently become larger and are being manufactured in clam shell types that are advantageous in terms of fuel efficiency and design.

Panel parts such as hoods can be assembled through a marriage process that loads an inner panel onto an outer panel, and a hemming process that hems the edges of the outer panel and inner panel.

In the marriage process, the outer panel is fixed to the marriage jig, and the inner panel is loaded onto the outer panel that has been fixed to the marriage jig. The marriage jig includes units such as alignment devices and locators for fixing the outer panel.

However, units such as alignment mechanisms and locators are provided as dedicated units according to vehicle type. Therefore, the investment cost may increase when assembling panel parts for multiple vehicle types, as new, specialized units may need to be manufactured or prepared for each vehicle type.

Furthermore, when the inner panel is loaded onto the outer panel, which has been fixed to the marriage jig, during the marriage process, a marriage defect may occur due to interference between a flange portion of the outer panel and the inner panel, thereby deteriorating the assemble quality of the panel parts.

The information contained in this background section has been prepared to promote understanding of the background of the present disclosure and may include matters that are not prior art already known to those having ordinary skill in the art.

SUMMARY

The present disclosure provides a panel assemble apparatus that can be commonly utilized in the marriage process of panel parts for assembling panel parts for various vehicle types and designs.

Additionally, the present disclosure provides a panel assemble apparatus capable of suppressing marriage interference between panel components.

According to an embodiment of the present disclosure, a panel assemble apparatus may include: a marriage jig frame, a plurality of alignment units installed in the marriage jig frame and configured to align a main panel part to a predetermined position on the marriage jig frame, and a plurality of external force application units installed on the marriage jig frame and configured to induce elastic deformation in the main panel part and form a marriage path along which a correlation panel part to be assembled with the main panel part can move.

According to an embodiment, the panel assemble apparatus may further include a plurality of multi-axis movement units on which the plurality of alignment units is mounted. In particular, each of the plurality of alignment units is installed on the marriage jig frame to move in the forward-backward direction, left-right direction, and up-down direction.

The plurality of alignment units may include: a plurality of supporters mounted on at least one multi-axis movement unit, among the plurality of multi-axis movement units, and configured to support an edge portion of the main panel part; and a plurality of locators mounted on at least one multi-axis movement unit, among the plurality of multi-axis movement units, and configured to clamp the edge portion of the main panel part.

Each of the plurality of external force application units may include a vacuum cup module movably installed on the marriage jig frame so as to be able to move forward and backward to allow vacuum adsorption of the flange portion formed at the edge of the main panel part.

Each of the plurality of external force application units may further include a roller module movably installed on the marriage jig frame so as to make rolling contact with a skin surface of the main panel part.

The vacuum cup module may include: a suction cup which is in close contact with the flange portion of the main panel part; an air intake portion disposed inside the suction cup; and a magnet disposed at the edge of the air intake portion.

Each of the roller modules may include a pressing roller which is rotatably installed on the support rod. and the pressing roller is configured to make rolling contact with the skin surface of the main panel part.

The pressing roller may be equipped with a cushioned foam roller.

Each of the roller modules may include a pressure sensor that detects the pressure of the pressing roller.

The vacuum cup modules may move forward to vacuum adsorb the flange portion of the main panel part.

The plurality of alignment units may release the support and fixation of the main panel part.

The roller module may move forward to induce elastic deformation of the skin surface of the main panel part;

The vacuum cup module may move backwards to induce elastic deformation of the flange portion of the main panel part.

The marriage path may be formed by the elastic deformation of the main panel part by the vacuum cup module and the roller module, and the correlation panel part moves along the marriage path.

A hood inner panel, which is the correlation panel part, may be loaded on a hood outer panel, which is the main panel part.

According to a panel assemble apparatus according to an embodiment, the initial investment cost of marriage process equipment can be reduced, and problems of line downtime due to marriage defects and problems of panel component assembly quality can be resolved.

In addition, the effects that can be obtained or expected from embodiments of the present disclosure are directly or implicitly disclosed in the detailed description of the embodiments of the present disclosure. In other words, various effects predicted according to an embodiment are disclosed in the detailed description that follows.

BRIEF DESCRIPTION OF THE DRAWINGS

Since these drawings are for reference in explaining exemplary embodiments of the present disclosure, the technical ideas of the present disclosure should not be interpreted as limited to the attached drawings.

Figure 1:
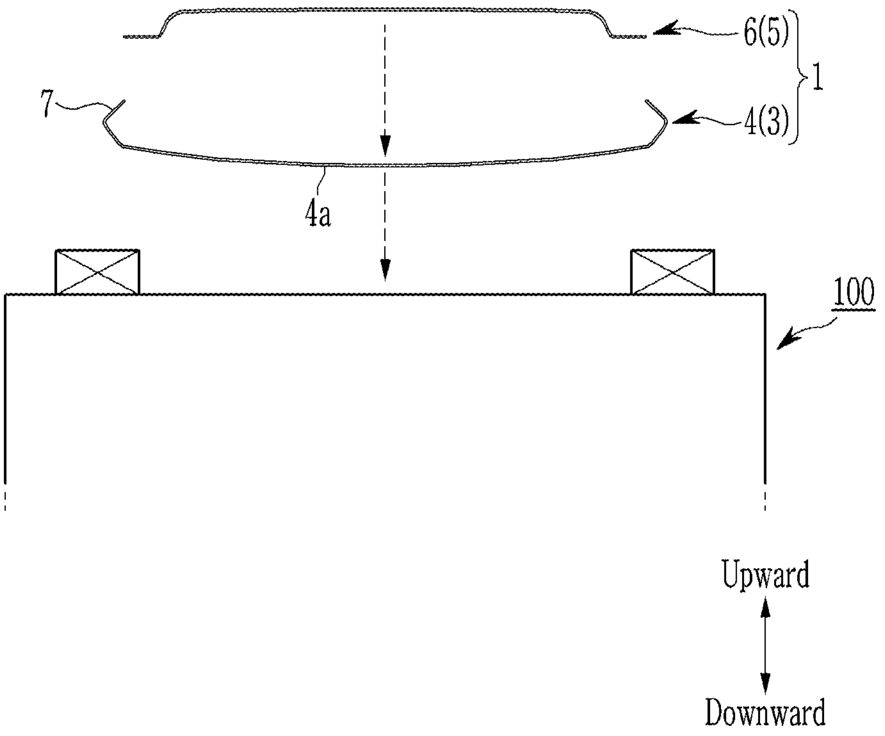
FIG. 1 is a schematic view illustrating the marriage process in which a panel assemble apparatus according to an embodiment is applied.

It should be understood that the drawings referenced above are not necessarily drawn to scale, but rather present rather simplified representations of various features illustrating the basic principles of the present disclosure. For example, specific design features of the present disclosure, including particular dimensions, orientations, locations, and shapes, should be determined in part by the particular intended application and usage environment.

DETAILED DESCRIPTION

Hereinafter, with reference to the attached drawings, embodiments of the present disclosure are described in detail so that those having ordinary skill in the art can easily implement the present disclosure. As those having ordinary skill in the art would realize, the described embodiments may be modified in various different ways, all without departing from the spirit or scope of the present disclosure.

The terminology used herein is for the purpose of describing specific disclosures only and is not intended to limit the disclosure. As used herein, singular forms are intended to also include plural forms, unless the context clearly indicates otherwise.

In addition, in the detailed description below, the names of the components are divided into first, second, etc. to distinguish them when the components are in a similar relationship, and the description below is not necessarily limited to that order.

As used herein, the terms 'comprise' and/or 'comprising' indicate the presence of specified features, integers, steps, operations, elements and/or components, but may also include one or more other features, integers or steps. It should also be understood that this does not exclude the presence or addition of elements, operations, components, and/or groups thereof.

As used herein, the term 'and/or' includes any one or all combinations of one or more items listed in association. When a component, device, element, or the like of the present disclosure is described as having a purpose or performing an operation, function, or the like, the component, device, or element should be considered herein as being "configured to" meet that purpose or to perform that operation or function.

In this specification, the term 'connected' indicates a physical relationship between two components in which the components are directly connected to each other by welding, rivets, SPR (Self Piercing Rivet), FDS (Flow Drill Screw), structural adhesive, etc., or indirectly connected through one or more intermediate components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (Purpose Built Vehicles), hydrogen-powered vehicles and other alternative fuel vehicles (e.g., other than petroleum fuel derived from resources).

Hereinafter, disclosures of the present disclosure are described in detail with reference to the accompanying drawings.

FIG. 1 is a schematic view illustrating the marriage process in which a panel assemble apparatus according to an embodiment is applied.

Referring to FIG. 1, a panel assemble apparatus 100 according to an embodiment may be applied to a vehicle body parts assembly process such as moving parts for a vehicle.

The moving parts may include panel parts such as a door assembly, a hood assembly, and a tail gate assembly.

In one example, the panel assemble apparatus 100 may be applied to a process of assembling a hood assembly 1. In another example, the panel assemble apparatus 100 may be applied to a process of assembling the hood assembly 1 of a clam shell type.

However, the scope of protection of the present disclosure should not be construed as being limited thereto, and the technical idea of the present disclosure can also be applied when assembling panel parts of other moving parts including door assemblies and tailgate assemblies.

The hood assembly 1 may include a hood outer panel 4 as a main panel part 3 and a hood inner panel 6 as a correlation panel part 5 connected to the hood outer panel 4.

The hood assembly 1 may be assembled by a marriage process for setting the hood outer panel 4 and the hood inner panel 6 by the panel assemble apparatus 100 according to an embodiment, and a hemming process for hemming edge portions of the hood outer panel 4 and the hood inner panel 6 by a hemming apparatus.

The hood outer panel 4 includes a flange portion 7 formed into a predetermined shape at the edge.

In the present disclosure, reference directions for describing the components below may be set as the forward-backward direction, the left-right direction, and the up-down direction.

Furthermore, in the present disclosure, 'upper end', 'upper portion', or 'upper surface' of a component indicates an end, portion, or surface of a component that is positioned relatively upper in the drawing, and 'lower end', 'lower portion', or 'lower surface' of a component indicates an end, portion, or surface of a component that is positioned relatively lower in the drawing.

Furthermore, in the present disclosure, an end of a component (e.g., one end or another (other) end, etc.) denotes an end of a component in any one direction, and an end portion of the component (e.g., one end portion) or other (another) end portion, etc.) denotes a portion of a component that includes that end.

The panel assemble apparatus 100 according to an embodiment may be commonly used in the marriage process of panel parts for assembling hood assemblies 1 of various vehicle types and various designs.

Additionally, the panel assemble apparatus 100 according to an embodiment may remove marriage interference between the hood outer panel 4 and the hood inner panel 6 in the marriage process.

Figure 2:
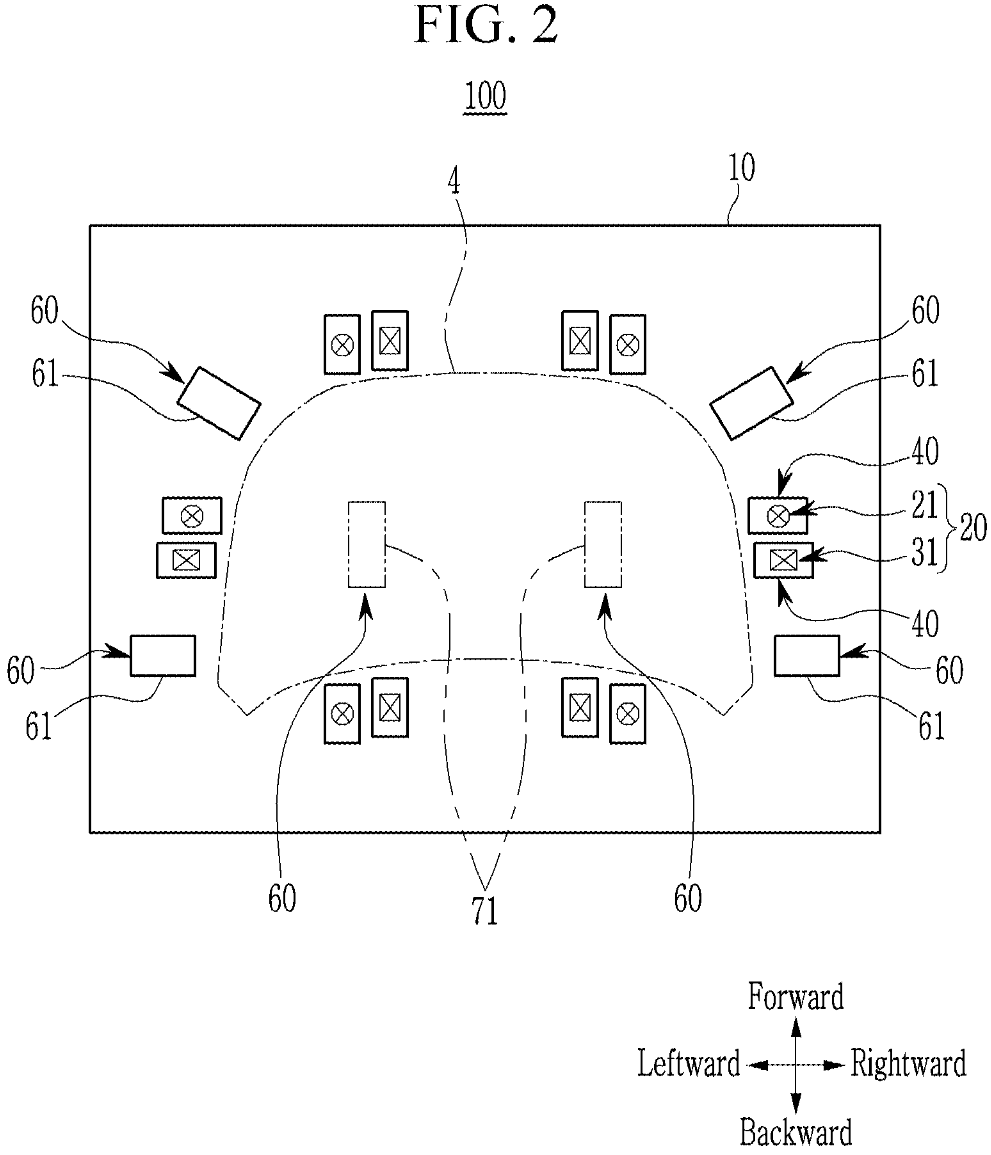
FIG. 2 is a block diagram showing the panel assemble apparatus according to an embodiment.

FIG. 2 is a block diagram showing the panel assemble apparatus 100 according to an embodiment.

Referring to FIG. 1 and FIG. 2, the panel assemble apparatus 100 may include a marriage jig frame 10, a plurality of alignment units 20, a plurality of multi-axis movement units 40, and a plurality of external force application units 60.

In an embodiment, the marriage jig frame 10 is configured to support and mount various components as described below. The marriage jig frame 10 is fixed to the floor of the process workshop. The marriage jig frame 10 may be provided with one frame or two or more connected frames.

The marriage jig frame 10 may include various accessory elements such as plates, brackets, blocks, and colors to support various components.

However, since the above-mentioned various accessory elements are for installing various components into the marriage jig frame 10, in an embodiment, except in exceptional cases, the above-mentioned accessory elements are collectively referred to as the marriage jig frame 10.

In an embodiment, the alignment units 20 are configured to align the hood outer panel 4 to a predetermined position on the marriage jig frame 10.

The alignment units 20 are installed in the marriage jig frame 10. Each of the alignment unit 20 includes a supporter 21 and a locator 31.

Figure 3:
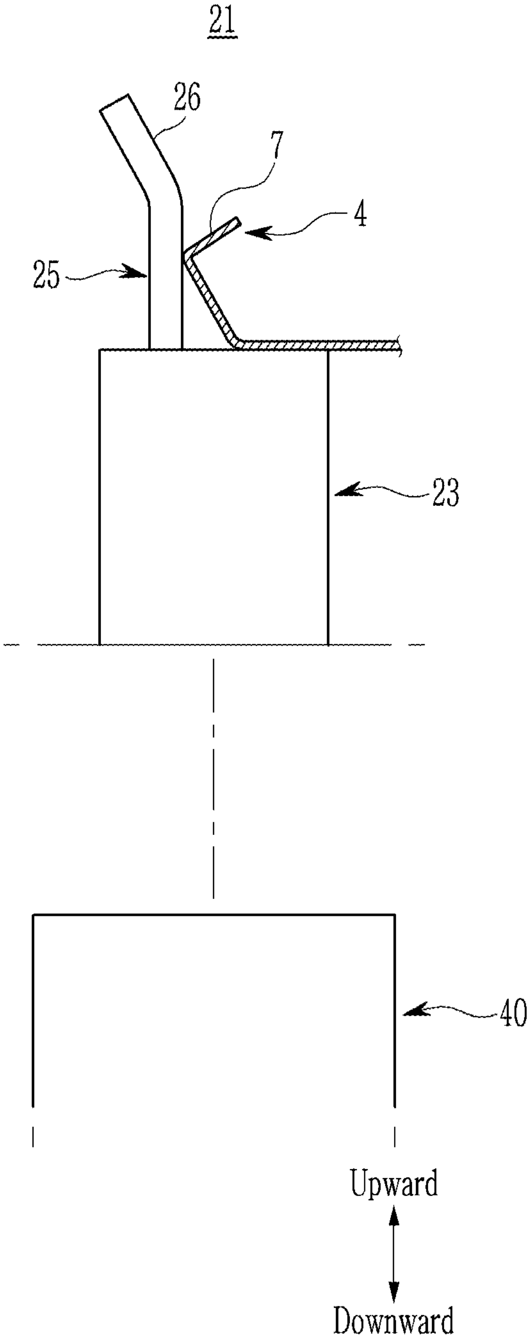
FIG. 3 illustrates a supporter of an alignment unit applied to the panel assemble apparatus according to an embodiment.

FIG. 3 illustrates a supporter 21 of an alignment unit applied to the panel assemble apparatus according to an embodiment.

Referring to FIG. 2 and FIG. 3, the supporter 21 according to an embodiment is configured to support an edge portion of the hood outer panel 4. Each of the supporters 21 includes a first panel support part 23 and a guide bar 25.

The first panel support part 23 may be provided in a plate shape, as an example. The first panel support part 23 may support an end portion of the hood outer panel 4, for example, the flange portion 7.

The guide bar 25 is disposed along the vertical direction on the marriage jig frame 10 and is fixed to the first panel support part 23. The guide bar 25 may guide an end of the hood outer panel 4, for example, the flange portion 7, in the vertical direction.

The guide bar 25 includes a bent portion 26 bent in the edge outer direction of the marriage jig frame 10 to guide the flange portion 7 of the hood outer panel 4 in the vertical direction.

The first panel support part 23 is connected to the multi-axis movement units 40, which is described below, and may move forward-backward direction, the left-right direction, and the up-down direction by the multi-axis movement units 40.

Figure 4A:
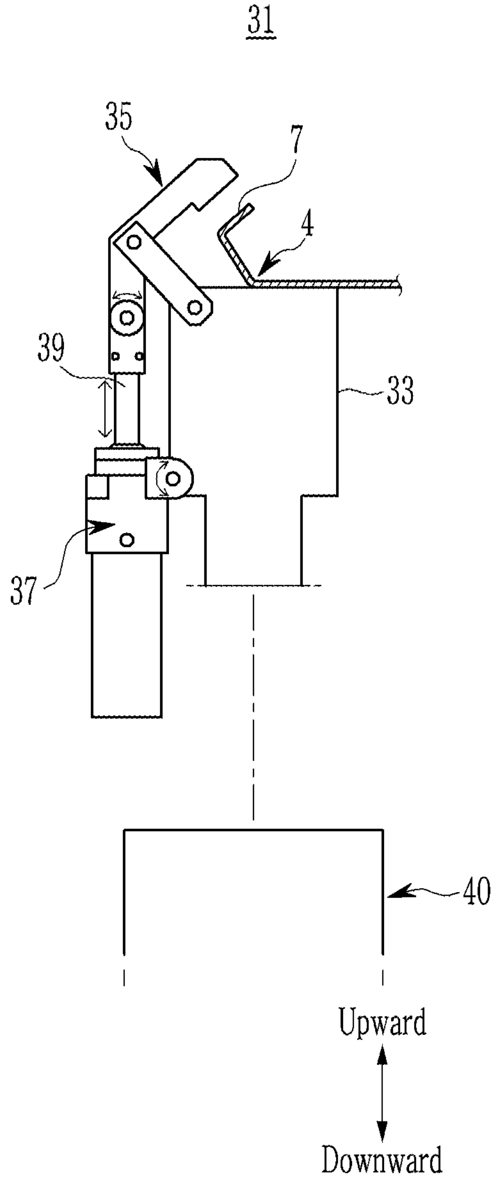
FIG. 4A and FIG. 4B are views illustrating a locator of the alignment unit applied to the panel assemble apparatus according to an embodiment.
Figure 4B:
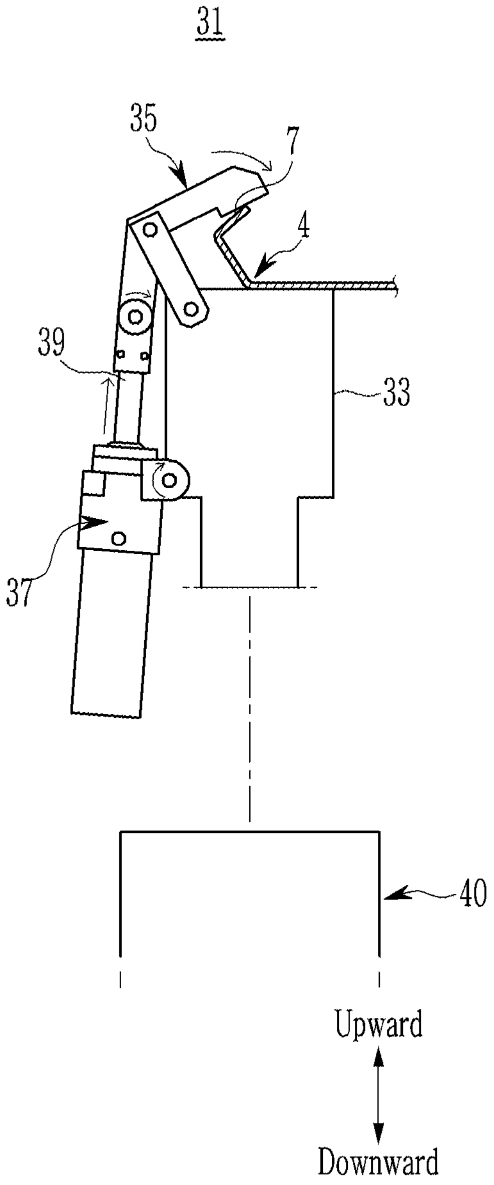

FIG. 4A and FIG. 4B are views showing a locator 31 of the alignment unit that is applied to the panel assemble apparatus according to an embodiment.

Referring to FIG. 2, FIG. 4A and FIG. 4 B, the locator 31 according to an embodiment is configured to clamp an end of the hood outer panel 4, for example the flange portion 7. Each of the locator 31 includes a second panel support part 33 and a clamper 35.

The second panel support part 33 may be provided in a plate shape, as an example. The second panel support part 33 may support one end of the hood outer panel 4, for example the flange portion 7.

The clamper 35 is connected to a clamp cylinder 37 hinged to a second panel support part 33 to clamp one end of the hood outer panel 4, for example, the flange portion 7. The clamper 35 is hinge-connected to an operation rod 39 of the clamp cylinder 37 and hinge-connected to the second panel support part 33.

The clamp cylinder 37 may, in one example, include a pneumatic cylinder. The second panel support part 33 is connected to the multi-axis movement units 40, which is described below, and may move along the forward-backward direction, the left-right direction, and the up-down direction by the multi-axis movement units 40.

Referring to FIG. 2, in an embodiment, the multi-axis movement units 40 are configured to move each of the supporters 21 and locators 31 of the alignment units 20 in the forward-backward direction, left-right direction, and up-down direction.

The multi-axis movement units 40 are installed on the marriage jig frame 10 at positions corresponding to the supporters 21 and/or the locators 31, and the multi-axis movement units 40 are connected to the supporters 21 and/or the locators 31.

Figure 5:
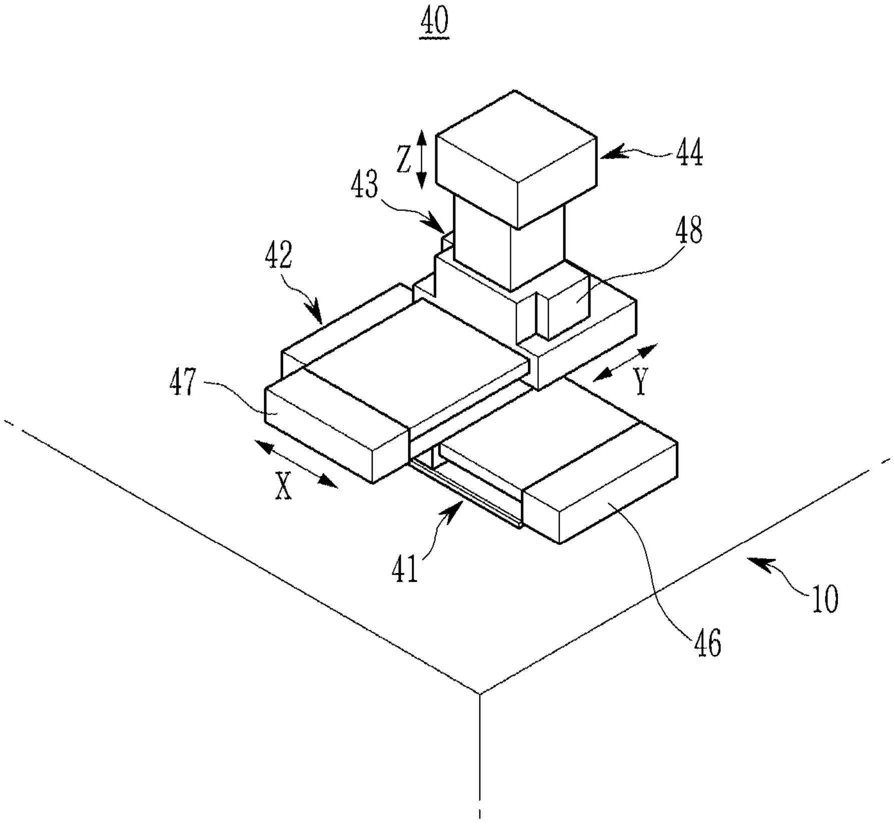
FIG. 5 is a perspective view illustrating a multi-axis movement unit applied to the panel assemble apparatus according to an embodiment.

FIG. 5 is a perspective view illustrating a multi-axis movement unit 40 applied to the panel assemble apparatus according to an embodiment.

Referring to FIG. 5, each of the multi-axis movement units 40 according to an embodiment includes a base block 41, a first moving block 42, a second moving block 43, and a third moving block 44.

The base block 41 is fixed to the marriage jig frame 10. The above first moving block 42 is slidably connected to the base block 41, for example, along the X-axis direction (e.g., the forward-backward direction). The second moving block 43 is slidably connected to the first moving block 42, for example, along the Y-axis direction (e.g., the left-right direction). And, the third moving block 44 is slidably connected to the second moving block 43, for example, along the Z-axis direction (e.g., the up-down direction).

The first moving block 42 may be moved along the X-axis direction by driving a first servo motor 46 installed in the base block 41. The second moving block 43 may be moved along the Y-axis direction by driving a second servo motor 47 installed in the first moving block 42. And, the third moving block 44 may be moved along the Z-axis direction by a third servo motor 48 installed in the second moving block 43.

The third moving block 44 may be connected with the first panel support part 23 of the supporter 21 as shown in FIG. 3. Alternatively, the third moving block 44 may be connected with the second panel support part 33 of the locator 31 as illustrated in FIG. 4.

Each of the first servo motor 46, second servo motor 47, and third servo motor 48 may be connected to a ball screw (not shown). And, the ball screws may be screw-connected with the first moving block 42, the second moving block 43, and the third moving block 44, respectively.

The combined structure of the servo motor and the ball screw, the combined structure of the ball screw and the moving block, and the guide structure of the moving block are known to a person of ordinary skill in the art, so a detailed explanation has been omitted.

Figure 6A:
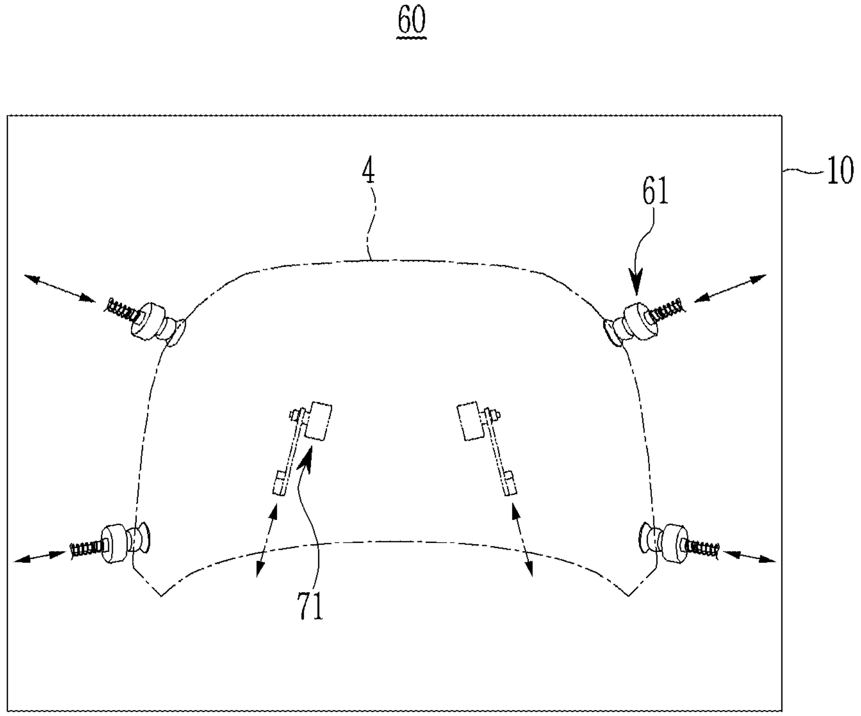
FIG. 6A and FIG. 6B are views illustrating an external force application unit applied to the panel assemble apparatus according to an embodiment.
Figure 6B:
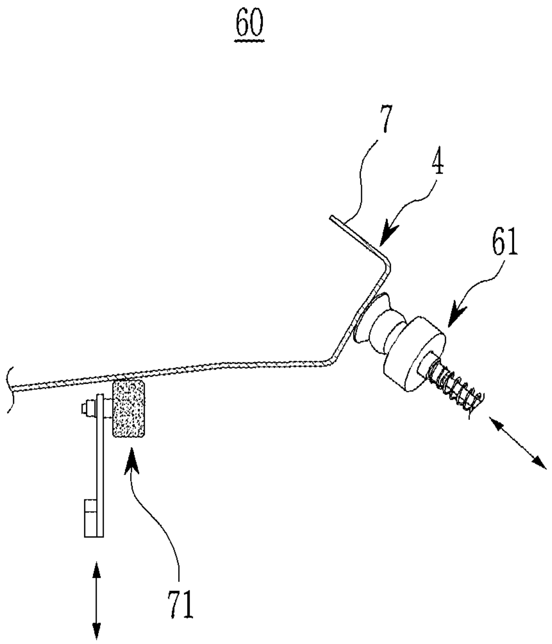

FIG. 6A and FIG. 6B are views showing an external force application unit applied to the panel assemble apparatus according to an embodiment.

Referring to FIG. 6A and FIG. 6B, in an embodiment, the external force application units 60 may induce elastic deformation of the hood outer panel 4 by applying an external force to the hood outer panel 4, thereby joining the hood outer panel 4 and the hood inner panel.

The external force application units 60 are installed in the marriage jig frame 10. Each of these external force application units 60 includes a vacuum cup module 61 and a roller module 71.

Figure 7A:
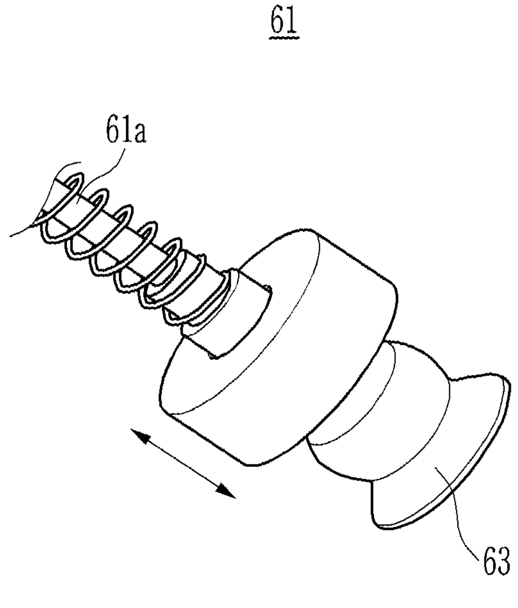
FIG. 7A and FIG. 7B are views illustrating a vacuum cup module of the external force application unit applied to the panel assemble apparatus according to an embodiment.
Figure 7B:
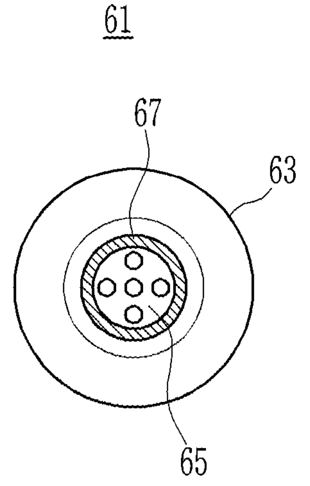

FIG. 7A and FIG. 7B are views illustrating a vacuum cup module of the external force application unit applied to the panel assemble apparatus according to an embodiment.

Referring to FIG. 6A to FIG. 7B, the vacuum cup modules 61 according to an embodiment are configured to induce elastic deformation of the flange portion 7 by vacuum adsorption of an end portion of the hood outer panel 4, for example, the flange portion 7.

The vacuum cup module 61 may be slidable on the marriage jig frame 10 along forward-backward direction. The vacuum cup modules 61 are connected to an operating cylinder (not shown), which is well known to a person of ordinary skill in the art, through a connecting rod 61*a*, and the vacuum cup modules 61 can be moved forward and backward by the operation of the operating cylinder.

In the detailed description and claims of the present disclosure, forward movement may be defined as movement in the panel direction of the process, and backward movement may be defined as movement in the direction away from the panel of the process.

The vacuum cup modules 61 may be installed slidable on the marriage jig frame 10 so that they can move along the forward-backward direction, the left-right direction, and the up-down direction depending on the shape and size of the hood outer panel 4.

Each of these vacuum cup modules 61 includes a suction cup 63, an air intake portion 65, and a magnet 67.

The suction cup 63 may be in close contact with an end of the hood outer panel 4, for example, the flange portion 7. The air intake portion 65 is disposed inside the suction cup 63 to suck in air.

Additionally, the magnet 67 is configured to magnetically attach an end portion of the hood outer panel 4, for example, the flange portion 7, to the suction cup 63. The magnet 67 may, in one example, be placed at the edge of the air intake portion 65. In one example, the magnet 67 may be a permanent magnet. In another example, the magnet 67 could be an electromagnet.

Figure 8A:
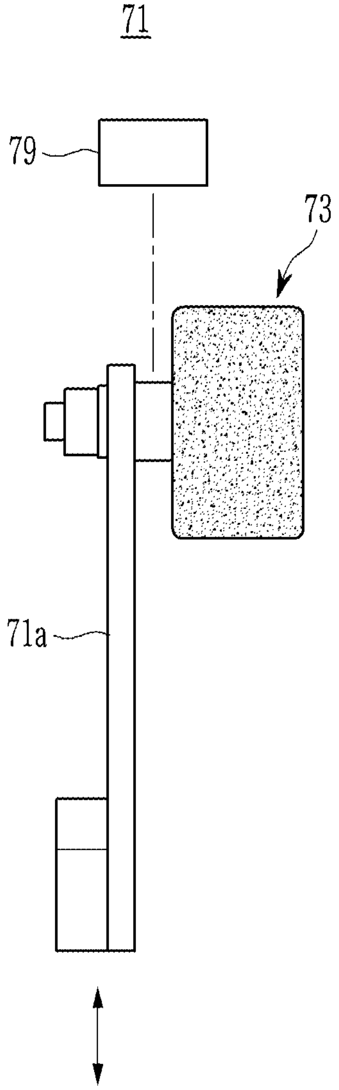
FIG. 8A and FIG. 8B are views illustrating a roller module of the external force application unit applied to the panel assemble apparatus according to an embodiment.
Figure 8B:
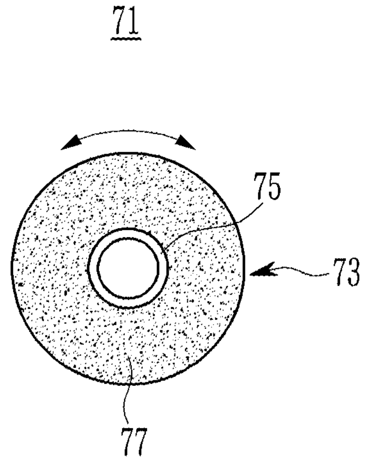

FIG. 8A and FIG. 8B are views illustrating a roller module of the external force application unit applied to the panel assemble apparatus according to an embodiment.

Referring to FIG. 6A, 6B, FIG. 8A and FIG. 8B, the roller module 71 according to an embodiment is in rolling contact with the skin surface 4*a* of the hood outer panel 4 (see FIG. 1) and is configured to induce elastic deformation of the skin surface 4*a*.

The roller module 71 may be movably installed on the marriage jig frame 10. The roller modules 71 are connected to an operating cylinder (not shown), which are well known to a person of ordinary skill in the art, through a support rod 71*a*, and the roller module 71 may be moved forward and backward by the operation of the operating cylinder.

The roller modules 71 may be movably installed on the marriage jig frame 10 along the forward-backward direction, the left-right direction, and the up-down direction depending on the shape and size of the hood outer panel 4.

Each of the roller modules 71 includes a pressing roller 73 that is rotatably installed on the support rod 71*a*.

The pressing roller 73 is rotatably installed on the support rod 71*a* via a bearing 75. The pressing roller 73 may be brought into rolling contact with the skin surface 4*a* of the hood outer panel 4 by the operation of the operation cylinder.

In one example, the pressing roller 73 may be equipped with a cushioned foam roller 77 to avoid or prevent damage to the skin surface 4*a* of the hood outer panel 4.

Each of the roller modules 71 further includes a pressure sensor 79 for detecting the pressure of the pressing roller 73. The detection signal of the pressure sensor 79 may be output to a controller (not shown).

FIG. 9 to FIG. 12B are views for explaining the operation of the panel assemble apparatus according to an embodiment and the marriage process of a hood assembly using the panel assemble apparatus according to an embodiment.

Hereinafter, the operation of the panel assemble apparatus 100 configured as described above, and the marriage process of the hood assembly 1 using the panel assemble apparatus 100 according to an embodiment are described in detail, with reference to FIG. 1 to FIG. 12B.

Figure 9:
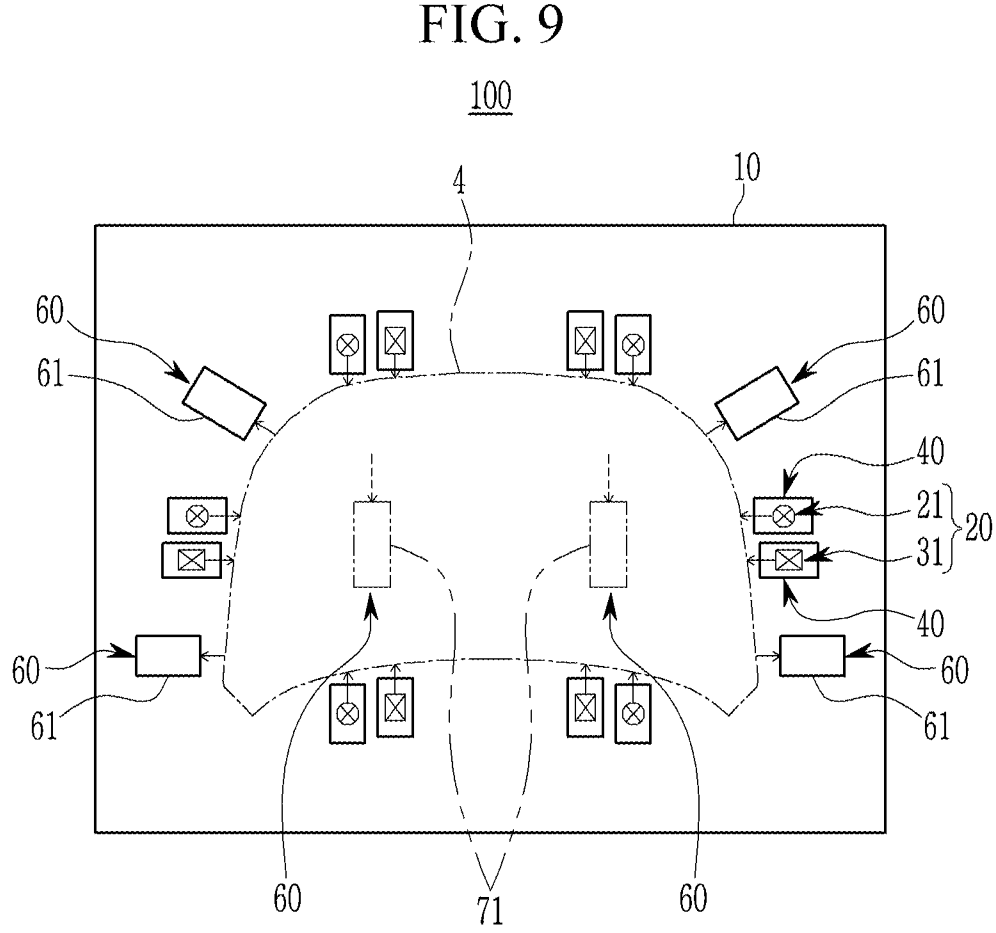
FIGS. 9 and 10 are views illustrating the movement of alignment units and external force application units in the marriage process of a hood assembly using the panel assemble apparatus according to an embodiment.

Referring to FIG. 9, in the marriage process of the hood outer panel 4 and the hood inner panel 6 for assembling the hood assembly 1, the position of the alignment units 20 is changed according to the component information of the hood assembly 1, such as the vehicle type, design, and size of the hood assembly 1, and the component specifications.

The supporters 21 and locators 31 of the alignment units 20 are moved to a predetermined position along the forward-backward direction, the left-right direction, and the up-down direction by the multi-axis movement units 40 according to the component information of the hood assembly 1.

In this state, the hood outer panel 4 is loaded onto the first panel support part 23 of the supporters 21 and the second panel support part 33 of the locators 31 by a robot hanger (not shown).

The flange portion 7 of the hood outer panel 4 is guided downward through the guide bar 25 of the supporters 21 and can be loaded onto the first panel support part 23 and the second panel support part 33.

Then, the clamper 35 of the locators 31 clamps the flange portion 7 of the hood outer panel 4. The hood outer panel 4 is aligned to a predetermined position on the marriage jig frame 10 by the supporters 21 and locators 31.

Figure 10:
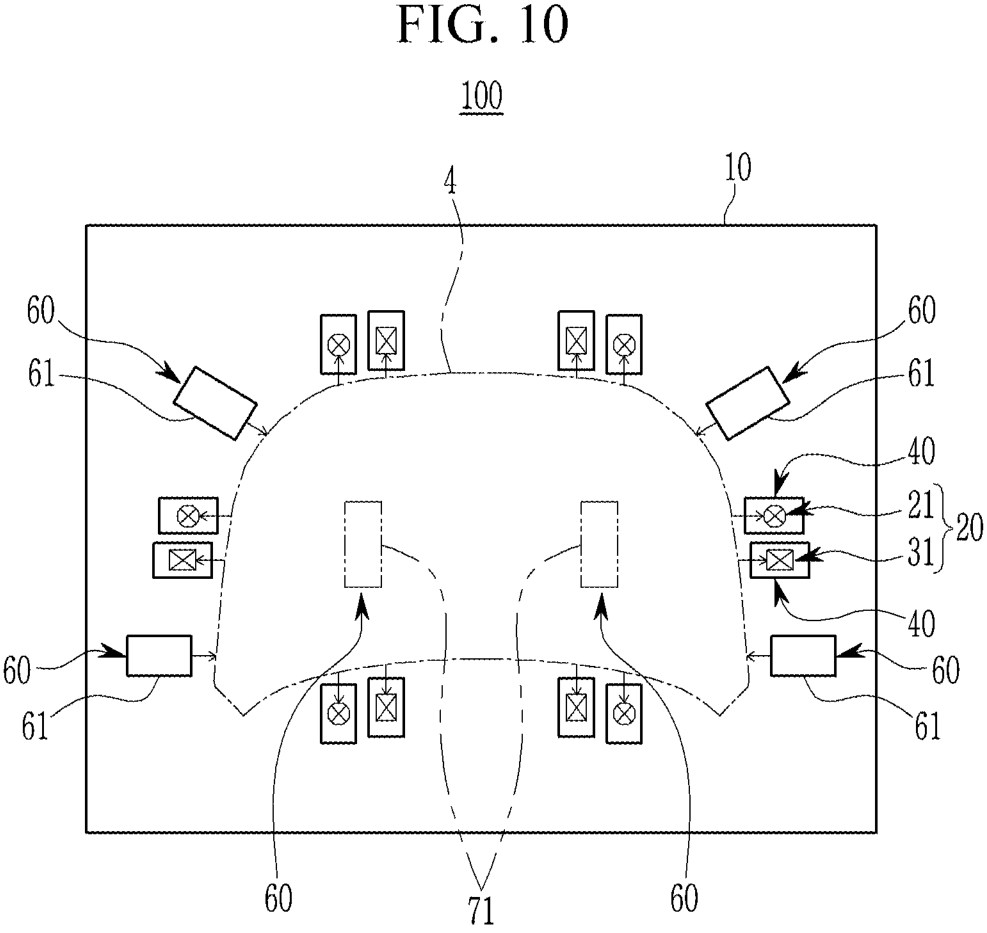

As shown in FIG. 10, the vacuum cup modules 61 of the external force application units 60, which had been moved backward, are moved forward toward the flange portion 7 of the hood outer panel 4.

The vacuum cup modules 61 suck air through the air intake portion 65 and vacuum adsorb the flange portion 7 of the hood outer panel 4 through the suction cup 63. The suction cup 63 may be brought into close contact with the flange portion 7 of the hood outer panel 4 by the magnetic force of the magnet 67 applied to the flange portion 7.

After completion of vacuum adsorption of the flange portion 7 by the vacuum cup modules 61, the clamping of the clamper 35 is released, and the supporters 21 and the locators 31 are moved in a direction away from the flange portion 7 of the hood outer panel 4 by the multi-axis movement units 40.

Figure 11:
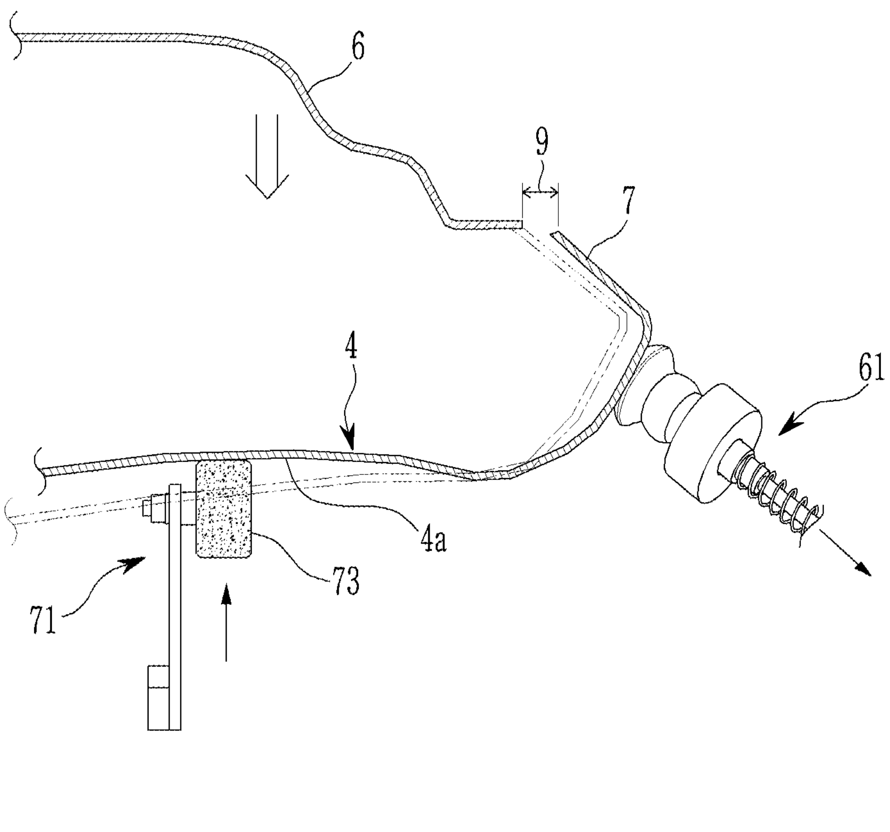
FIG. 11 is a view illustrating elastic deformation of a skin surface of the hood outer panel by the operation of the panel assemble apparatus according to an embodiment.

As shown in FIG. 11, the vacuum cup modules 61 are moved in a direction away from the flange portion 7 of the hood outer panel 4. At the same time, the roller modules 71 of the external force application units 60, which are moved backward, move forward.

The pressing roller 73 of the roller modules 71 comes into rolling contact with the skin surface 4*a* of the hood outer panel 4, and applies pressure to the skin surface 4*a*, thereby inducing elastic deformation of the skin surface 4*a*. Simultaneously, the vacuum cup modules 61 induce elastic deformation of the flange portion 7 of the hood outer panel 4.

The pressure sensor 79 of the roller modules 71 detects the pressure of the pressing roller 73 and outputs the detected signal to the controller (not shown). The controller changes the position of the roller modules 71 according to the detected signal of the pressure sensor 79 and can control the pressure of the pressing roller 73 applied to the skin surface 4*a*.

Accordingly, by causing the vacuum cup modules 61 and the roller modules 71 to induce elastic deformation of the hood outer panel 4, the marriage path 9 of the hood inner panel 6 to be assembled with the hood outer panel 4 may be set. In other words, by spreading the end portion of the hood outer panel 4, i.e., the flange portion 7, the marriage path or gap 9 may be formed so that the hood inner panel 6 can move toward the inside of the hood outer panel 4.

Figure 12A:
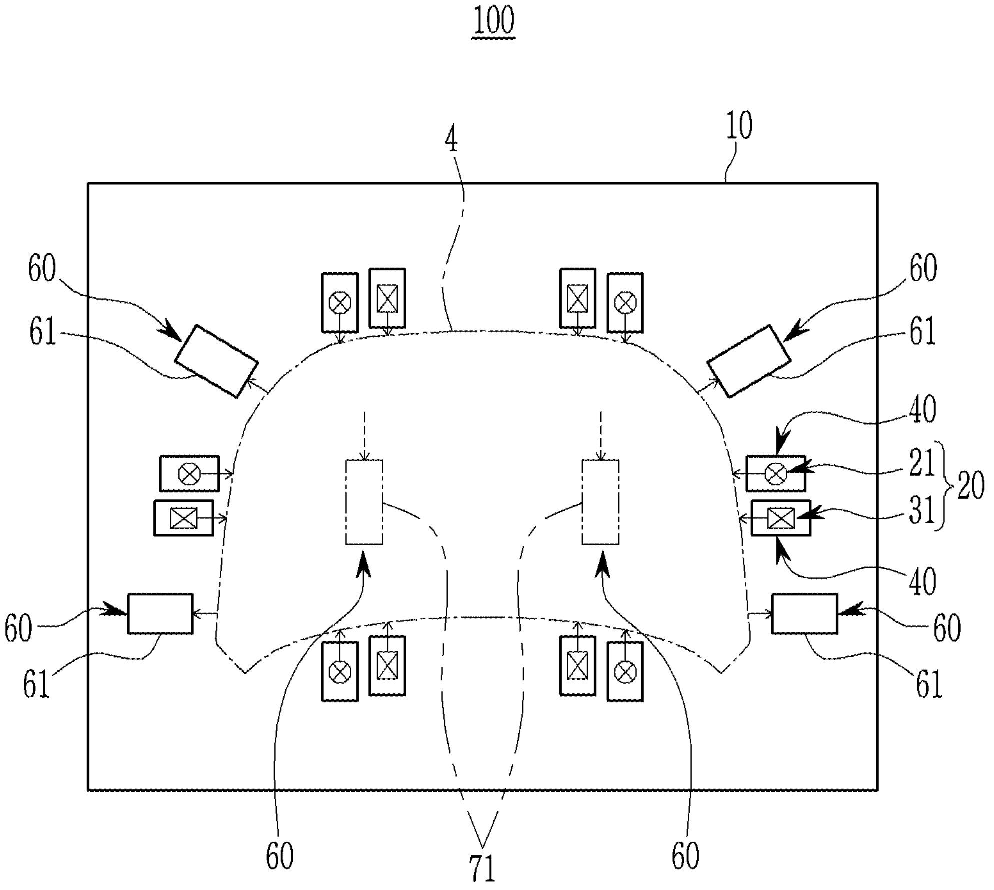
FIG. 12A and FIG. 12B are views for explaining the operation of the panel assemble apparatus according to an embodiment and the marriage process of a hood assembly using the panel assemble apparatus according to an embodiment.
Figure 12B:
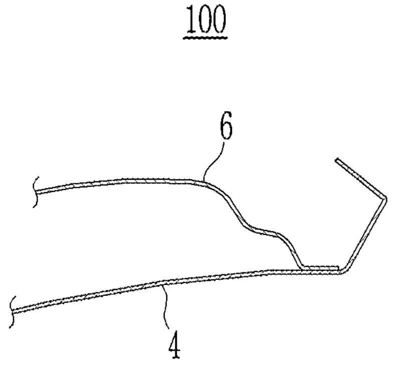

Referring to FIG. 12A and FIG. 12B, in this state, the hood inner panel 6 is transported or moved along the marriage path 9 by a robot hanger (not shown) and loaded onto the hood outer panel 4.

The vacuum cup modules 61 are moved backwards in a direction away from the flange portion 7 while releasing the vacuum adsorption of the flange portion 7. Additionally, the roller modules 71 are moved back to their original positions. Accordingly, the hood outer panel 4 is restored to its original shape as the external force caused by the vacuum cup modules 61 and roller modules 71 is removed.

The supporters 21 and locators 31 of the alignment units 20 are moved back to a predetermined position along the forward-backward direction, left-right direction, and up-down direction by the multi-axis movement units 40.

The supporters 21 and locators 31 support and clamp the flange portion 7 of the hood outer panel 4 by the operation mentioned above.

Thus, the marriage process of the hood outer panel 4 and the hood inner panel 6 is completed through a series of processes as described above.

Then, in the hemming process, when the hemming apparatus (not shown) hems the edge portions of the hood outer panel 4 and the hood inner panel 6, the assembly of the hood assembly 1 is completed.

According to an embodiment of the panel assemble apparatus 100 described so far, in the marriage process of the hood outer panel 4 and the hood inner panel 6, the alignment units 20 can be moved in multi-axis directions by the multi-axis movement units 40.

Therefore, the panel assemble apparatus 100 according to an embodiment can be commonly utilized in the marriage process for assembling hood assemblies 1 of different vehicle types and various designs.

Accordingly, according to the panel assemble apparatus 100 according to an embodiment, the design degree of freedom of the hood assembly 1 can be improved, and the initial investment cost of the marriage process equipment can be reduced.

Furthermore, the panel assemble apparatus 100 according to an embodiment can induce elastic deformation of the hood outer panel 4 and load the hood inner panel 6, thereby eliminating marriage interference between the hood outer panel 4 and the hood inner panel 6.

Accordingly, the panel assemble apparatus 100 according to an embodiment can solve the problem of line non-operation due to poor marriage between hood outer panel 4 and hood inner panel 6 and the problem of assemble quality of hood assembly 1.

Although the some embodiments of the present disclosure have been described above, the present disclosure is not limited thereto, and various modifications may be made within the scope of the claims, the detailed description of the present disclosure, and the attached drawings, which also fall within the scope of the present disclosure.

DESCRIPTION OF SYMBOLS

1: hood assembly 3: main panel part
4: hood outer panel 4*a*: skin surface
5: correlation panel part 6: hood inner panel
7: flange portion 9: marriage path
10: marriage jig frame 20: alignment unit
21: supporter 23: first panel support part
25: guide bar 31: locator
33: second panel support part
35: clamper
37: clamp cylinder 39: operation rod
40: multi-axis movement unit 41: base block
42: first moving block 43: second moving block
44: third moving block 46: first servo motor
47: second servo motor 48: third servo motor
60: external force application unit
61: vacuum cup module
61*a*: connecting rod 63: suction cup
65: air intake portion 67: magnet
71: roller module 71*a*: support rod
73: pressing roller 75: bearing
77: foam roller 79: pressure sensor
100: panel assemble apparatus

What is claimed is:

1. A panel assemble apparatus comprising:

a marriage jig frame;

a plurality of alignment units installed in the marriage jig frame and configured to align a main panel part to a predetermined position on the marriage jig frame;

a plurality of external force application units installed on the marriage jig frame and configured to induce elastic deformation in the main panel part and form a marriage path along which a correlation panel part to be assembled with the main panel part moves, wherein each of the plurality of external force application units includes:

a vacuum cup module movably installed on the marriage jig frame and configured to move forward and backward to allow vacuum adsorption of a flange portion formed at an edge portion of the main panel part, and a roller module movably installed on the marriage jig frame and configured to make rolling contact with a skin surface of the main panel part; and a plurality of multi-axis movement units on which the plurality of alignment units is mounted, wherein each of the plurality of multi-axis movement units is configured to move in a forward-backward direction, a left-right direction, and an up-down direction, wherein the plurality of alignment units includes:

a plurality of supporters mounted on at least one multi-axis movement unit, among the plurality of multi-axis movement units, and configured to support an edge portion of the main panel part; and a plurality of locators mounted on at least one multi-axis movement unit, among the plurality of multi-axis movement units, and configured to clamp the edge portion of the main panel part, wherein the vacuum cup module is configured to move forward and vacuum adsorb the flange portion of the main panel part, and the plurality of alignment units releases support and fixation of the main panel part, wherein the roller module is configured to move forward to induce elastic deformation of the skin surface of the main panel part and the vacuum cup module is configured to move backwards to induce elastic deformation of the flange portion of the main panel part, and wherein the marriage path is formed by the elastic deformation of the main panel part by the vacuum cup module and the roller module, and the correlation panel part moves along the marriage path.

2. The panel assemble apparatus of claim 1, wherein the vacuum cup module comprises:

a suction cup which is in close contact with the flange portion of the main panel part;

an air intake portion disposed inside the suction cup; and, a magnet disposed at an edge of the air intake portion.

3. The panel assemble apparatus of claim 1, wherein the roller module comprises a pressing roller rotatably installed on a support rod and configured to make the rolling contact with the skin surface of the main panel part.

4. The panel assemble apparatus of claim 3, wherein the pressing roller is equipped with a cushioned foam roller.

5. The panel assemble apparatus of claim 3, wherein the roller module comprises a pressure sensor configured to detect a pressure of the pressing roller.

6. The panel assemble apparatus of claim 1, wherein the correlation panel part is a hood inner panel and the main panel part is a hood outer panel, and wherein the hood inner panel is loaded on the hood outer panel.

* * * * *